United States Patent Office 3,005,349
Patented Oct. 24, 1961

3,005,349
DYNAMIC RATIO CONTROL APPARATUS
Wilhelm S. Everett, P.O. Box 429, Santa Paula, Calif.
Filed June 4, 1956, Ser. No. 589,128
4 Claims. (Cl. 73—507)

This invention relates to a system for automatically maintaining a pre-determined ratio between first and second operating characteristics or functions.

In process industries, it is frequently necessary to control the ratio between the operating characteristics of two machines. For example, by maintaining the operating speeds of two or more pumps in a pre-determined ratio, fluids may be continuously mixed in automatically maintained proportions. In other instances, it may be desirable to maintain the speeds of several engines at a pre-determined ratio with respect to a master control machine.

Heretofore, the practice has been to employ a "force balance" system in which two rotational rates or other operating characteristics are transduced to pressure and the pressures then compared by a force balance arm system. When the arm system is in balance the two rates are operating in the desired ratio. If this ratio varies, the system is unbalanced resulting in an error pressure proportional to such variation. This error pressure is then employed to vary one of the rates to a value to return the force arm system to the balance point corresponding to the desired ratio.

A primary object of the present invention is to provide a novel apparatus for maintaining operating characteristics in pre-determined ratios in which the function or operating characteristic to be controlled is transduced to a speed parameter rather than a force or pressure.

Another object is to provide a system of the above type in which the transducing apparatus includes a pneumatic system employing compressed air whereby remote control may be effected and the necessity for complicated mechanical linkages is avoided.

Still another important object is to provide a dynamic ratio control apparatus which does not require any electrical control and therefore presents no fire or explosion hazards when used in oil refineries and the like.

Another important object is to provide a ratio control apparatus for maintaining desired ratios between machines which operate at relatively low rates of speed.

Briefly, these and other objects and advantages of the present invention are attained by providing transducer means in which certain operating characteristics or functions of units to be controlled are transduced into fluid quantities such as quantities of air. These quantities of fluid are made proportional to the particular characteristic under investigation and are used to drive suitable fluid motors to provide rotational speeds proportional to the operating characteristics to be controlled. A differential means is then used for providing an error signal which is a function of the difference between the rotational speeds applied to it. A control means responsive to this error signal in turn controls the operating characteristics of one or more of the units to maintain operation at a desired pre-determined ratio.

In a preferred embodiment of the invention, the fluid comprises compressed air arranged to drive air motors and the air motors themselves are connected to a conventional differential gear for providing the error signal. The error signal preferably controls a variable orifice valve connecting a pressure source to a pressure responsive diaphragm valve in turn connected to control the operating characteristics of one of the units.

A better understanding of a preferred embodiment of the present invention will be had by referring to the accompanying drawings, in which.

Figure 1:
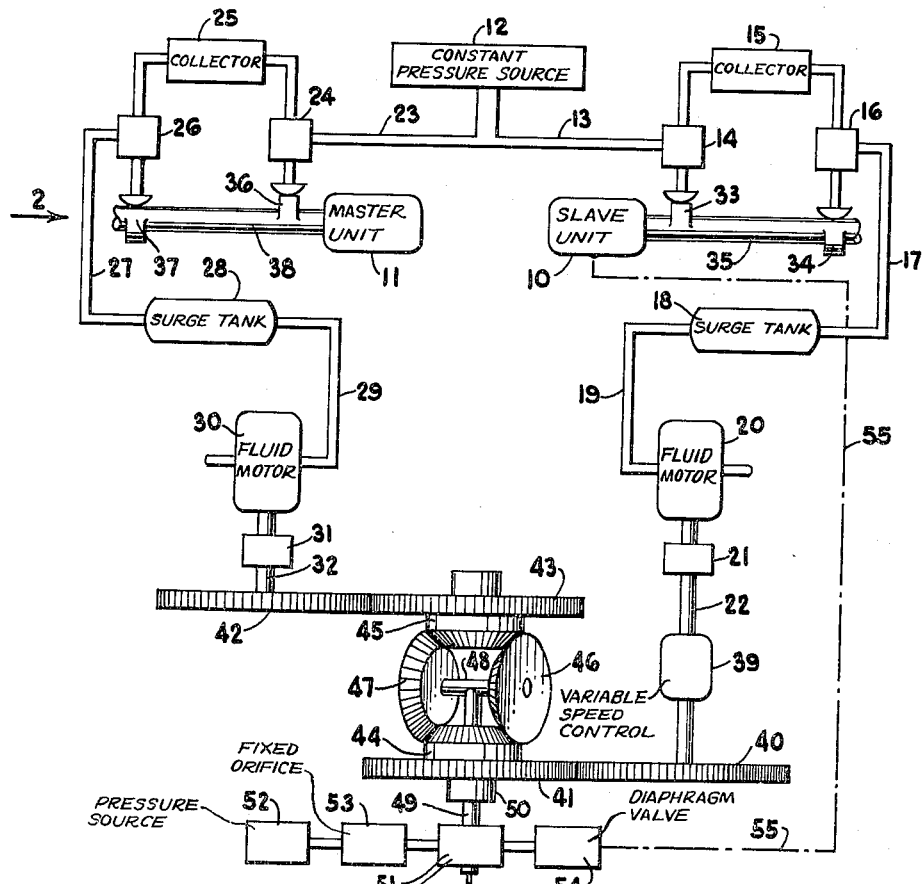
FIGURE 1 is a schematic diagram of the dynamic ratio control apparatus.

Referring to the upper center portion of FIGURE 1, there are shown two machines or units 10 and 11. These may be engines, flow meters, pumps, or the like. For purposes of describing the present invention it will be assumed that the unit 11 is a control or master unit and that the unit 10 is to be operated in a given ratio with respect to the unit 11. For example, if the units 11 and 10 are pumps for mixing two ingredients in the ratio of 1:2, the pump 10 would be operated at twice the speed of the pump 11 thereby maintaining the desired proportion in the mixture. Thus, the ratio of the operation of the pump 11 to the pump 10 should be 1:2.

As shown in FIGURE 1, the system of the present invention for maintaining this ratio includes a constant air pressure source 12 for supplying air through a first conduit 13 to a first transducing means associated with the unit 10. This transducing means includes an inlet poppet valve 14 passing air from conduit 13 to a first collector tank 15 and thence through an outlet poppet valve 16 and a conduit 17, to a first surge tank 18. From the surge tank 18 the air passes through a conduit 19 to an air motor 20 provided with speed reduction gears 21 for rotating an output shaft 22 at a speed proportional to the operation of the unit 10, all as will become clear when the operation of the system is described.

Similarly, the air pressure source 12 supplies compressed air through a conduit 23 to a second transducer means associated with the unit 11. This second transducer means includes an inlet poppet valve 24 for passing air from conduit 23 through a second collector tank 25, outlet poppet valve 26, and conduit 27 to a second surge tank 28. The poppet valves 24 and 26, collector tank 25, and surge tank 28 are identical to the poppet valves 14 and 16, collector tank 15 and first surge tank 18 associated with the unit 10. From the surge tank 28, an outlet conduit 29 passes air through a second air motor 30 provided with speed reduction gears 31 for rotating an output shaft 32 at a speed proportional to the operation of the unit 11.

The inlet and outlet poppet valves 14 and 16 for the unit 10 are operated by a pair of cams 33 and 34 circumferentially spaced on a shaft 35. Thus, rotation of the shaft 35 by unit 10 will operate the poppet valves 14 and 16 at rates determined by the rate of rotation of the shaft 35. Similarly, poppet valves 24 and 26 are operated by cams 36 and 37 on a shaft 38 rotated by the unit 11.

Figure 2:
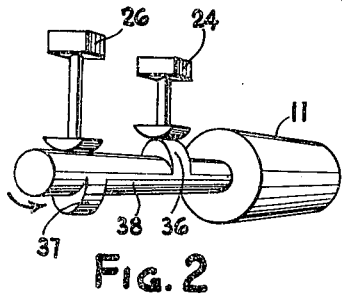
FIGURE 2 is a perspective view of a portion of the apparatus shown in FIGURE 1.

As shown more clearly in FIGURE 2, it will be noted that the cams are circumferentially spaced on the rotating shaft by approximately one hundred eighty degrees. The arrangement is such that the inlet poppet valve, such as the valve 24, will first be operated whereby compressed air will pass from the source 12 into the collecting tank 25 filling this tank to a pressure equal to that of the source. Subsequently, the outlet poppet valve such as the valve 26 will be opened and the collected air in the tank 25 will pass through the conduit 27 to the surge tank 28. If the speed of the shaft 38 increases, the opening and closing of the inlet and outlet poppet valves will increase thereby increasing the quantity of air passing through the outlet conduit 27 to the surge tank 28. On the other hand, if the shaft decreases in speed, the quantity of air passing through the outlet conduit 27 to the surge tank 28 will be decreased. The poppet valves 14 and 16 are operated in an identical manner by the cams 33 and 34 for the unit 10. The quantities of air passing through the outlet conduits 17 and 27 per unit time are therefore functions of the speeds of the shafts 35 and 38. The provision of the surge tanks 18 and 28 smooth out the pulsating nature of the air flow so that the air passing through conduits 19 and 29 to the air motors 20 and 30 is relatively smooth and the output shafts 22 and 32 of the air motors are operated at relatively constant speeds respectively proportional to the shaft speeds of the units 10 and 11.

In FIGURE 1, the output shaft 22 for the air motor 20 passes through a variable speed control 39 to a spur gear 40. The variable speed control 39 is adjusted in accordance with the desired ratio to be maintained to rotate the spur gear 40 in a direction opposite to, but at a speed identical with, the rotational speed of the output shaft 32 from air motor 30. For example, if the unit 10 is to operate at twice the speed as the unit 11, the variable speed drive 39 is adjusted to reduce the speed of shaft 22 to one-half its value so that the spur gear 40 will be rotating at the same speed as the output shaft 32 for the motor 30 when the air motor 20 is rotating at twice the speed as the air motor 30.

As shown in FIGURE 1, the spur gear 40 connects to the lower drive gear 41 of a differential system. The output shaft 32 from the air motor 30 is in turn connected to a spur gear 42 connecting to the upper drive gear 43 of the differential. The gears 41 and 43 are connected to suitable bevel gears 44 and 34 respectively meshing with bevel gears 46 and 47 adapted to rotate on a common shaft 48. A downwardly directed shaft 49 extends from the shaft 48 concentrically through the bevel gear 44 and a suitable bearing collar 50 to a variable orifice, leak-off valve 51.

The variable orifice, leak-off valve 51 constitutes part of a control means comprising a source of air pressure 52 for passing air through a fixed orifice 53, and the valve 51, to a diaphragm control valve 54. Diaphragm control valve 54 in turn is connected to the unit 10 through a control means schematically indicated at 55 to control the speed of the unit 10 in accordance with the opening of the variable orifice, leak-off valve 51.

The operation of the overall system will be evident from the above description. As described previously, quantities of air will be passed through the air motors 20 and 30 at a rate proportional to the speeds of the shafts 35 and 38 of the units 10 and 11. As also mentioned, if it is desired that the unit 10 operate at twice the speed of the unit 11, the variable speed control 39 on the shaft 22 for the air motor 20 is adjusted to cause the spur gear 40 to rotate at one half the speed of the shaft 22 so that the inputs to the differential gears 41 and 43 from the spur gears 40 and 42 are identical. It will be evident that when the outer differential gears 41 and 43 are traveling at the same speed in opposite directions, the shafts 48 and 49 to the variable orifice, leak-off valve 51 will remain stationary.

Should the unit 11 increase slightly in speed, the quantity of air to the air motor 30 will increase thereby increasing the speed of rotation of the spur gear 42. This increased speed of spur gear 42 increases the speed of gear 43 causing the shaft 48 connecting the bevel gears 46 and 47 to rotate slowly. This rotation causes the shaft 49 to rotate thereby varying the orifice of the leak-off valve 51 to change the pressure on the diaphragm control valve 54. This pressure change is reflected through the control means 55 to the unit 10 to cause an increase in its speed to a value up to twice the speed of the unit 11. The increased speed of the shaft 35 of the unit 10 then causes a greater quantity of air to pass through the air motor 20 thereby increasing the speed of output shaft 22 and subsequently the speed of spur gear 40 to increase the speed of differential 41 and thus cause the shaft 48 to cease moving. The action of the variable orifice valve 51 and diaphragm control valve 54 is thus checked.

If it is desired to change the ratio at which the units 10 and 11 are to be maintained, then the variable speed drive 39 may be adjusted such that the new ratio between the output shafts 22 and 32 of the motors 20 and 30 will result in identical speeds for the spur gears 40 and 42 whereby the differential will be effective to control the unit 10 as previously described.

It will be evident that by employing long fluid conduits 17 and 27 and 19 and 29 between the outlet poppet valves 16 and 26 and the air motors 20 and 30, the units 10 and 11 may be controlled from a remote location. Further, it will be evident that the response of the system may be varied by increasing the air pressure in the source 12 supplying air to the air motors 20 and 30. In other words, the faster these motors 20 and 30 rotate, the more sensitive will be the differential to any differences in speed.

Figure 3:
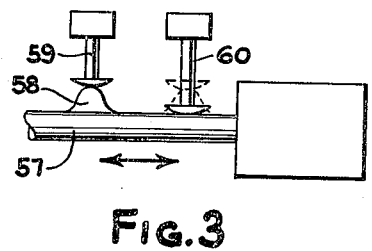
FIGURE 3 illustrates a modified function adapted to be controlled by the apparatus of FIGURE 1.

FIGURE 3 illustrates a transducer means for a reciprocating shaft 57 such as the shaft of one of many reciprocating pumps employed in present day process industries. In order to provide a quantity of air that is proportional to the rate of reciprocation of the pump, a single cam 58 may be provided on the reciprocating shaft 57. This cam 58 is arranged to operate an inlet poppet valve 59 at one end of its stroke and subsequently an outlet poppet valve 60 at the other end of its stroke. It will be evident that the rate of operation of the poppet valves and thus the quantity of air passed by the poppet valves will be proportional to the speed of reciprocation. Therefore, by means of the present invention, either rotating or reciprocating shaft speeds may be controlled.

It will be evident that more than one unit 10 may be controlled by the system of the present invention. For example, there may be provided second, third, and fourth differential gears associated with second, third and fourth units in which the upper gears corresponding to the gear 43 of the differenital illustrated in FIGURE 1 are all caused to rotate in accordance with the speed of the spur gear 42, as determined by the speed of the gear 43 of the master control unit 11. Speeds representing the outputs of the second, third and fourth units are then fed into the corresponding lower gears of the second, third and fourth differentials whereby the error signals developed, if any, may be used to control the respective units themselves to maintain their speeds in the desired predetermined ratio with respect to the master control unit 11.

Further modifications within the scope and spirit of the present invention will occur to those skilled in the art. The dynamic ratio control apparatus is, therefore, not to be thought of as limited to the specific embodiment chosen for illustrative purposes.

What is claimed is:

1. A dynamic ratio control apparatus for automatically maintaining a predetermined ratio between first and second shaft speeds, comprising, in combination: first and second transducer means for providing first and second quantities of gas that are functions respectively of said first and second shaft speeds; said first and second transducer means comprising a constant pressure source of said gas; first and second constant volume containers; first and second inlet poppet valves for opening and closing inlet conduits between said source and said containers respectively; first and second outlet poppet valves for opening and closing outlet conduits passing from said containers respectively; means on said shafts for alternately operating said inlet poppet valves and said outlet poppet valves at rates which are functions of said shaft speeds so that the quantities of gas passing from said first and second containers per unit time are functions of said first and second shaft speeds; first and second fluid motors connected to receive and convert said quantities of gas respectively into first and second rotational speeds having a ratio equal to said predetermined ratio; a variable speed control device connected to one of said fluid motors to change its rotational speed to a value equal to the value of the rotational speed of the other of said fluid motors so long as the ratio of said first and second rotational speeds remain equal to said predetermined ratio; differential means connected between said variable speed control device and said other of said fluid motors for providing an error signal that is a function of any difference between the rotational speed from said variable speed control device and the rotational speed of the other of said fluid motors; and control means responsive to said error signal for controlling one of said shaft speeds to maintain said predetermined ratio.

2. An apparatus according to claim 1, in which said means on said shafts comprise cams positioned to respectively operate said first and second inlet and outlet poppet valves.

3. An apparatus according to claim 2, in which said shafts are reciprocating, each shaft having a cam engaging a respective inlet poppet valve at one position of its stroke, and a corresponding outlet poppet valve at a second position of its stroke.

4. An apparatus according to claim 2, in which said shafts are rotating, each shaft having two cams circumferentially spaced thereon for engaging said inlet and outlet poppet valves at rates determined by the rotational speeds of said shafts.

References Cited in the file of this patent

UNITED STATES PATENTS

| | | |
|---|---|---|
| 706,554 | Hall | Aug. 12, 1902 |
| 1,709,706 | Boddie | Apr. 16, 1929 |
| 1,961,360 | Grunsky | June 5, 1934 |
| 2,201,683 | Johansson | May 21, 1940 |
| 2,231,133 | MacNeil | Feb. 11, 1941 |
| 2,269,332 | Bench et al. | Jan. 6, 1942 |
| 2,329,216 | Peters | Sept. 14, 1943 |
| 2,354,634 | Griswold | July 25, 1944 |

FOREIGN PATENTS

| | | |
|---|---|---|
| 81,293 | Germany | May 20, 1895 |